(12) United States Patent
Millischer et al.

(10) Patent No.: US 11,644,537 B2
(45) Date of Patent: May 9, 2023

(54) LIGHT DETECTION AND RANGING (LIDAR) STEERING USING COLLIMATED LENSES

(71) Applicant: UATC, LLC, San Francisco, CA (US)

(72) Inventors: Martin Millischer, San Francisco, CA (US); Gaetan Pennecot, San Francisco, CA (US)

(73) Assignee: UATC, LLC, Mountain View, CA (US)

( * ) Notice: Subject to any disclaimer, the term of this patent is extended or adjusted under 35 U.S.C. 154(b) by 391 days.

(21) Appl. No.: 16/898,829

(22) Filed: Jun. 11, 2020

(65) Prior Publication Data

US 2021/0389426 A1    Dec. 16, 2021

Related U.S. Application Data

(60) Provisional application No. 63/024,781, filed on May 14, 2020.

(51) Int. Cl.
| | |
|---|---|
| *G01S 7/481* | (2006.01) |
| *G01S 7/486* | (2020.01) |
| *G01S 17/89* | (2020.01) |
| *G01S 17/931* | (2020.01) |
| *G01S 17/00* | (2020.01) |

(52) U.S. Cl.
CPC .......... *G01S 7/4814* (2013.01); *G01S 7/486* (2013.01); *G01S 7/4817* (2013.01); *G01S 17/89* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 2007/0076186 A1* | 4/2007 | Miyazaki | ............... | G01S 17/42 |
| | | | | 356/5.01 |
| 2010/0008588 A1* | 1/2010 | Feldkhun | ............... | G01S 17/89 |
| | | | | 382/206 |
| 2020/0041258 A1* | 2/2020 | Wang | ..................... | G01S 17/89 |
| 2020/0088859 A1 | 3/2020 | Shepard et al. | | |

FOREIGN PATENT DOCUMENTS

| | | | | | |
|---|---|---|---|---|---|
| JP | 5-203745 A | * | 8/1993 | ............ | G01S 17/48 |
| JP | 11-133153 | * | 5/1999 | ............ | G01S 17/93 |
| WO | WO2020049055 | | 3/2020 | | |

OTHER PUBLICATIONS

International Search Report and Written Opinion for PCT/US2021/032410, dated Oct. 28, 2021, 15 pages.

* cited by examiner

*Primary Examiner* — Bernarr E Gregory
(74) *Attorney, Agent, or Firm* — Dority & Manning, P.A.

(57) ABSTRACT

A LIDAR system is provided. In one example, the LIDAR system can include an emitter configured to emit a light signal through one or more transmit lenses positioned along a transmit path to provide transmit signals to a surrounding environment. The LIDAR system can include a receiver spaced apart from the emitter. The receiver configured to detect return signals corresponding to reflected transmit signals from the surrounding environment. The return signals can be received via one or more receive lenses positioned along a receive path. The LIDAR system can include an actuator coupled to the one or more transmit lenses. The actuator can be operable to impart a motion to the one or more transmit lenses to provide for steering of the transmit signals in the surrounding environment.

20 Claims, 11 Drawing Sheets

LIGHT DETECTION AND RANGING (LIDAR) STEERING USING COLLIMATED LENSES

RELATED APPLICATION

The present application is based on and claims benefit of priority of U.S. Provisional Patent Application No. 63/024,781, titled "Light Detection and Ranging (LIDAR) Steering Using Collimated Lenses," having a filing date of May 14, 2020, which is incorporated by reference herein.

FIELD

The present disclosure relates generally to LIDAR systems.

BACKGROUND

LIDAR systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment. The LIDAR system also includes circuitry to measure the time-of-flight (that is, the elapsed time from emitting the laser beam to detecting the reflected laser beam). The time-of-flight measurement is used to determine the distance of the LIDAR system to the object.

SUMMARY

Aspects and advantages of embodiments of the present disclosure will be set forth in part in the following description, or may be learned from the description, or may be learned through practice of the embodiments.

One example aspect of the present disclosure is directed to a light detection and ranging (LIDAR) system. The LIDAR system can include an emitter configured to emit a light signal through one or more transmit lenses positioned along a transmit path to provide transmit signals to a surrounding environment. The LIDAR system can include a receiver spaced apart from the emitter. The receiver configured to detect return signals corresponding to reflected transmit signals from the surrounding environment. The return signals can be received via one or more receive lenses positioned along a receive path. The LIDAR system can include an actuator coupled to the one or more transmit lenses. The actuator can be operable to impart a motion to the one or more transmit lenses to provide for steering of the transmit signals in the surrounding environment.

Another example embodiment of the present disclosure is directed to a method for scanning a surrounding environment using a light detection and ranging (LIDAR) system. The method can include emitting a light signal from an emitter through one or more transmit lenses along a transmit path to provide a transmit signal into a surrounding environment. The method can include imparting a first motion to the one or more transmit lenses to provide for steering of the transmit signal in the surrounding environment. The method can include imparting a second motion to one or more receive lenses disposed along a receive path. The method can include detecting, at a receiver, a return signal corresponding to a reflection of the transmit signal. The return signal can be received via the one or more receive lenses disposed along the receive path.

Another example embodiment of the present disclosure is directed to an autonomous vehicle. The autonomous vehicle can include a light detection and ranging (LIDAR) system coupled to a vehicle body of the autonomous vehicle. The LIDAR system can include one or more channels. Each of the one or more channels can include an emitter configured to emit a light signal through one or more transmit lenses positioned along a transmit path to provide a transmit signal. The one or more transmit lenses can include a first axis collimating lens and a second axis collimating lens. Each of the one or more channels can include a receive spaced apart from the emitter. The receiver can be configured to detect a return signal received via one or more receive lenses positioned along a receive path. The return signal can correspond to a reflection of the transmit signal. Each of the one or more channels can include a transmit actuator coupled to the one or more transmit lenses. The transmit actuator can be operable to impart a motion to the first axis collimating lens to provide for steering of the transmit signal.

Other example aspects of the present disclosure are directed to other systems, methods, vehicles, apparatuses, tangible non-transitory computer-readable media, and devices for motion prediction and/or operation of a device including a vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
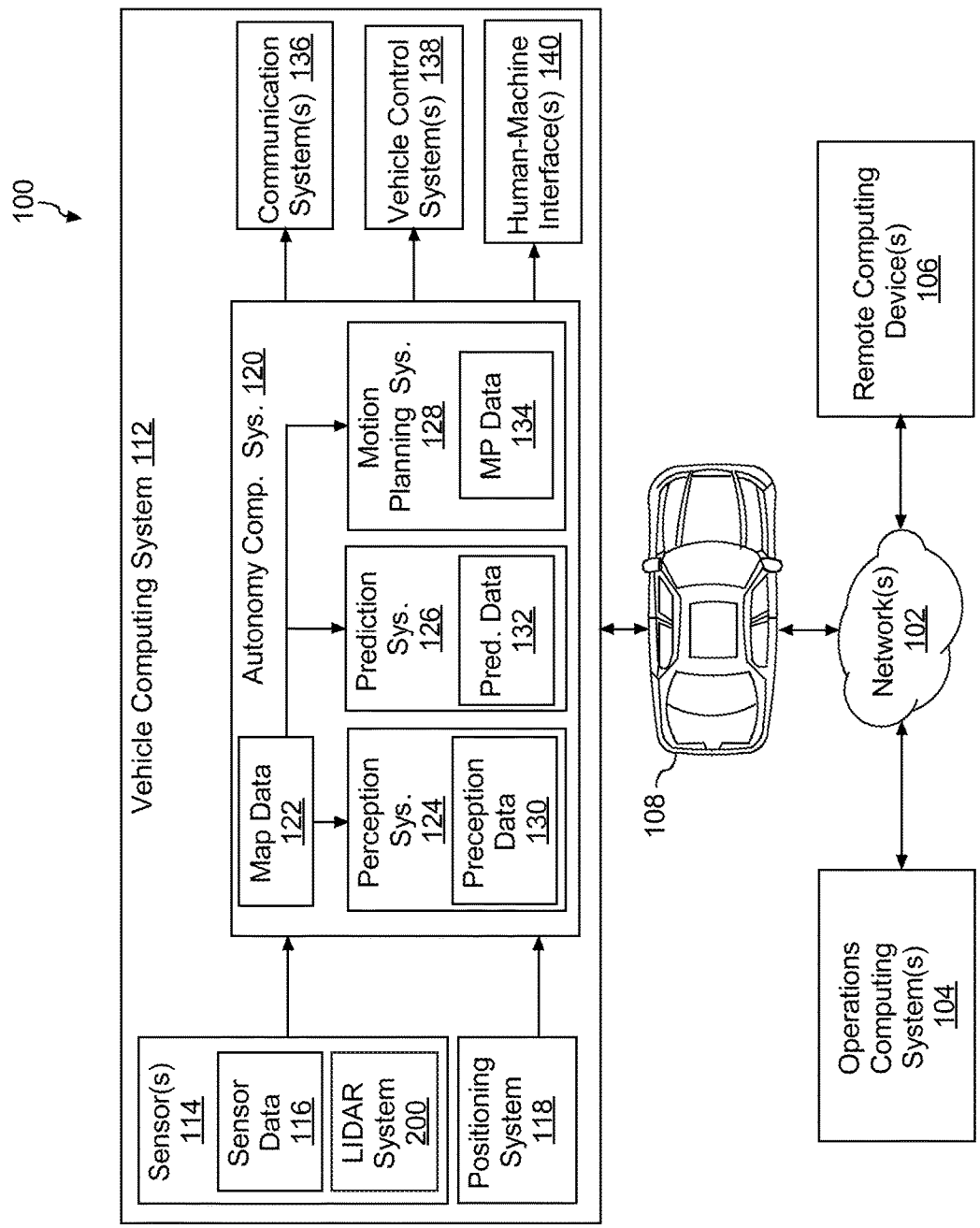
FIG. 1 depicts a block diagram of an example system for controlling the computational functions of an autonomous vehicle according to example embodiments of the present disclosure.

Example aspects of the present disclosure are directed to a light detection and ranging (LIDAR) system. The LIDAR system can be used, for instance, in conjunction with an autonomous vehicle. Robustness of LIDAR technology when used in conjunction with, for instance, autonomous vehicles can provide for the generation of robust point clouds representative of a depth or distance to objects in a surrounding environment. Density or resolution of these point clouds can be increased by steering transmit signals across more points in a surrounding environment. Detected return signals corresponding to reflections of the transmit signals can be used for generation of the point cloud with additional data points (e.g., points representative of depth or distance to a surface) within the point cloud.

According to example aspects of the present disclosure, steering of the transmit signals provided by a LIDAR system can be accomplished by imparting motion (e.g., an oscillating motion) to one or more lenses associated with the LIDAR system. For example, a LIDAR system can include one or more channels. Each channel can include an emitter (e.g., a laser diode) configured to emit a light signal through one or more transmit lenses disposed along a transmit path to provide a transmit signal to a surrounding environment. Each channel can further include a receiver spaced apart from the emitter. The receiver can be configured to detect a return signal received via one or more receive lenses disposed along a receive path. The return signal can correspond to a reflection of the transmit signal from a surface in the surrounding environment.

An actuator can be coupled to the one or more transmit lenses to impart motion (e.g., an oscillating motion) to the one or more transmit lenses along one or more axes. The motion of the lenses can cause steering of the transmit signal in the surrounding environment. In some embodiments, the actuator can be coupled to one or more receive lenses to impart motion (e.g., an oscillating motion) to the one or more receive lenses along one or more axes. In this way, aspects of the present disclosure can provide for increased steering of transmit signals in LIDAR systems by simply imparting motion to one or more lenses used to condition transmit signals for emission into a surrounding environment and/or imparting motion to one or more lenses used to focus return signals onto a detector.

In some implementations, the LIDAR system can be implemented onboard an autonomous vehicle (e.g., ground-based vehicle, aerial vehicle, etc.). The autonomous vehicle can include various systems and devices configured to control the operation of the autonomous vehicle. For example, the autonomous vehicle can include an onboard vehicle computing system (e.g., located on or within the autonomous vehicle) that is configured to operate the autonomous vehicle. The onboard vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. This can include, for example, detecting of object(s) (e.g., pedestrians, vehicles, bicycles/bicyclists, etc.) within the vehicle's surrounding environment, predicting the future motion trajectory of those objects, and planning the vehicle's motion to avoid interference with the object(s). Moreover, the autonomous vehicle can include a communications system that can allow the autonomous vehicle to communicate with a computing system that is remote from the autonomous vehicle such as, for example, that of a service entity.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system of the service entity can help to coordinate the performance of vehicle services by autonomous vehicles. For instance, the operations computing system can include a service platform. The service platform can include a plurality of back-end services and front-end interfaces, which are accessible via one or more APIs. For example, an autonomous vehicle and/or another computing system that is remote from the autonomous vehicle can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system (e.g., the service platform) so that the vehicle computing system can communicate with the operations computing system via a network. Once online, the operations computing system can communicate a vehicle service assignment indicative of the requested vehicle services and/or other data to the autonomous vehicle.

The autonomous vehicle can be configured to operate in one or more modes including, for example, a fully autonomous operating mode, a semi-autonomous operating mode, and a manual operating mode. The fully autonomous (e.g., self-driving) operating mode can be one in which the autonomous vehicle can provide driving and navigational operation with minimal and/or no interaction from a human driver present in the autonomous vehicle. The semi-autonomous operating mode can be one in which the vehicle can operate with some interaction from a human driver present in the vehicle. The manual operating mode can be one in which a human driver present in the autonomous vehicle manually controls (e.g., acceleration, braking, steering) the autonomous vehicle via one or more input devices (e.g., steering device) of the autonomous vehicle.

The LIDAR system can be implemented on the autonomous vehicle to obtain data associated with the surrounding environment in which the autonomous vehicle is operating (e.g., while online with a service entity, performing a vehicle service, etc.). In particular, the emitter of the LIDAR system and the receiver of the LIDAR system can be spaced apart from one another along a lateral direction of the autonomous vehicle or a vertical direction of the autonomous vehicle. It should be understood, using the disclosures provided herein, that the lateral direction can extend between opposing sides (e.g., first side and second side) of the autonomous vehicle. It should also be understood that the vertical direction can extend between a bottom portion of the autonomous vehicle and a top portion of the autonomous vehicle. Aspects of an example LIDAR system will now be discussed in more detail.

A LIDAR system can include one or more channels. Each channel can include an emitter. The emitter can be a light source configured to emit a light signal. In some embodiments, the light source can be, for instance, a laser diode. The light signal can have varying divergence along different axes. For instance, the light signal can have a first divergence along a first axis (e.g., a vertical axis) relative to the light source and a second divergence along a second axis (e.g., a horizontal axis) relative to the light source. In some embodiments, the first axis and the second axis can be perpendicular or near perpendicular (e.g., within 5° of perpendicular).

The divergence along an axis can be indicative of an increase in beam diameter or radius of the light signal along the axis with distance from the light source. For instance, a first divergence associated with a vertical axis can be indicative of an increase in beam diameter or radius of the light signal along the vertical axis with distance from the light source. A second divergence associated with a horizontal axis can be indicative of an increase in beam diameter or radius of the light signal along the horizontal axis with distance from the light source. In some implementations, the first divergence of the light signal along the first axis (e.g., vertical axis) can be different than the second divergence of the light signal along the second axis (e.g., horizontal axis). For instance, the second divergence can be greater than the first divergence, or vice versa.

The light signal can be provided from the light source through one or more transmit lenses positioned along a transmit path. The transmit lenses shape the light signal for propagation over distance as the transmit signal for the LIDAR system. In some embodiments, the one or more transmit lenses can include a first axis collimating lens (e.g., fast axis collimating lens) and a second axis collimating lens (e.g., slow axis collimating lens). The first axis collimating lens can be an astigmatic lens configured to act or have optical power primarily on the first axis (e.g., the vertical axis) such that the first axis collimating lens collimates light at a maximum along the first axis and at a minimum along the second axis. The second axis collimating lens can be an astigmatic lens configured to act or have optical power primarily on the second axis (e.g., the horizontal axis) such that the second axis collimating lens collimates light at a maximum along the second axis and at a minimum along the first axis. Passing the light signal through the first axis collimating lens and the second axis collimating lens can result in the transmit signal of a channel of the LIDAR system to have a square or nearly square profile, despite the varying divergence along the first axis and the second axis of the light signal from the light source.

The first axis collimating lens can be located closer to the emitter of the light signal. The second axis collimating lens can be separated from the first axis collimating lens by a distance along the transmit path. In some embodiments, the distance between the first axis collimating lens and the second axis collimating lens can be determined as a function of a shape of the emitter. As one example, for rectangle shaped emitters, the distance between the first axis collimating lens and the second axis collimating lens can be determined as a function of a ratio of a width of the rectangle emitter (short dimension) relative to the length of the rectangle emitter (long dimension). In some embodiments, the distance between the first axis collimating lens and the second axis collimating lens can be the range of about 60 mm to about 140 mm.

According to example aspects of the present disclosure, the LIDAR system can include an actuator operable to impart motion (e.g., an oscillating motion) to the first axis collimating lens and/or the second axis collimating lens. The actuator can be, for instance, a piezoelectric device, a linear solenoid actuator, or other suitable actuator that is operable to impart motion to a lens.

More particularly, in some embodiments, an actuator can be configured to impart motion to the first axis collimating lens by imparting an oscillating motion to the first axis lens along the first axis (e.g., the vertical axis). For instance, the actuator can oscillate the first axis collimating lens up and down in the vertical direction. The adjustment of the first axis collimating lens up and down will result in steering of the transmit signal in the surrounding environment along the first axis (e.g., vertical axis).

The oscillation motion can have various characteristics to provide for a continuous and fast sweep of the transmit signal along first axis in the field of view in the surrounding environment. In some embodiments, the oscillating motion can have a span. The span can be a distance from a maximum point of the oscillating motion along the first axis and a minimum point of the oscillating motion along the first axis. In some example embodiments, the span can be in the range of about 100 microns to about 700 microns. In addition, the oscillating motion can have an oscillation frequency (e.g., number of oscillation cycles per second). In some example embodiments, the oscillation frequency can be in the range of about 1 kHZ to about 200 kHz.

Aspects of the present disclosure are discussed with reference to an oscillating motion for purposes of illustration and discussion of example embodiments. Those of ordinary skill in the art, using the disclosures provided herein, will understand that other types of motion and/or variations of an oscillating motion can be imparted to the one or more lenses in the receive path and/or the transmit path without deviating from the scope of the present disclosure. For instance, the motion can be dynamically changed during the steering for focusing purposes. A LIDAR system can have the ability to focus transmit signals and/or receive signals on specific areas within the field of view. As one example, a mid-range LIDAR system can have the ability to focus transmit signals and/or return signals within a narrow angular range on a highway to accommodate faster driving speeds.

In some embodiments, the LIDAR system can be configured to provide for sweeping of the transmit beam along multiple axes by imparting motion to a plurality of transmit lenses, such as sweeping of the transmit beam along both a first axis (e.g., vertical axis) and a second axis (e.g., horizontal axis). For instance, the LIDAR system can include an actuator coupled to the first axis collimating lens and an actuator coupled to the second axis collimating lens.

The actuator coupled to the first axis collimating lens can impart a first motion (e.g., first oscillating motion) to the first axis collimating lens along the first axis (e.g., vertical axis) to provide for sweeping of the transmit signal of the LIDAR system along the first axis in the surrounding environment. The actuator coupled to the second axis collimating lens can impart a second motion (e.g., second oscillating motion) to the second axis collimating lens along the second axis to provide for sweeping of the transmit signal of the LIDAR system along the second axis (e.g., horizontal axis) in the surrounding environment.

Aspects of the present disclosure are discussed with reference to sweeping a transmit signal along a vertical axis and/or a horizontal axis for purposes of illustration and discussion. Those of ordinary skill in the art, using the disclosures provided herein, will understand that the transmit signal can be moved in any direction(s) or axis(s) without deviating from the scope of the present disclosure.

Each channel in the LIDAR system can include a receiver. The receiver can be, for instance, a detector (e.g., an avalanche photodiode) operable to detect return signals. The return signals can correspond to reflected transmit signals from surfaces in the surrounding environment.

The receiver can receive the return signal through one or more receive lenses disposed along a receive path. The one or more receive lenses can be configured to focus the return signal onto the receiver. In some embodiments, the one or more receive lenses can include one or more first axis toroidal lenses and one or more second axis toroidal lenses. The first axis toroidal lens(es) can be an astigmatic lens configured to act or have optical power primarily on the first axis (e.g., the vertical axis) such that the first axis toroidal lens focuses light at a maximum along the first axis and at a minimum along the second axis. The second axis toroidal lens(es) can be an astigmatic lens configured to act or have optical power primarily on the second axis (e.g., the horizontal axis) such that the second axis toroidal lens focuses light at a maximum along the second axis and at a minimum along the first axis.

The one or more receive lens can include a focus lens that is located closest to the receiver. The focus lens can perform the final focusing of the return signal onto the receiver. In some embodiments, an actuator can be configured to impart motion (e.g., an oscillating motion) along the first axis to the focus lens. This can synchronize the focusing of the return signal on to the receiver with a position of the corresponding transmit signal during the sweeping of the transmit signal along the first axis in the surrounding environment.

In some embodiments, the actuator used to impart motion to the first axis collimating lens in the transmit path can be the same actuator used to impart motion to the focus lens in the receive path. In this particular implementation, the motion (e.g., oscillating motion) of the first axis collimating lens can be similar to the motion (e.g., oscillating motion) of the focus lens. For instance, an oscillating motion of the first axis collimating lens and an oscillating motion of the focus lens can have a span and/or a frequency that are approximately equal. As used herein, the use of the term "approximately" or "about" in conjunction with a value refers to within 10% of the value. In some embodiments, an oscillating motion of the first axis collimating lens and an oscillating motion of the second axis collimating lens are equal to synchronize the receive signal with the transmit signal during steering of the transmit signal in the surrounding environment. In this way, the receive signal can be associated with the same angle of steering as the transmit signal.

In embodiments where the same actuator is used for the first axis collimating lens and the focus lens, the receive path can include a particular arrangement of lenses such that similar oscillating motion can be imparted to first axis collimating lens and the focus lens to provide for synchronization between the transmit signal and the return signal. For instance, the receive path can include a first toroidal lens operable to act on the second axis (e.g., the horizontal axis). The receive path can include a second toroidal lens operable to act on the first axis (e.g., the vertical axis). The receive path can include a middle toroidal lens operable to act on the first axis located downstream in the receive path relative to the first toroidal lens and the second toroidal lens. The receive path can include a focus lens located downstream of the middle toroidal lens and located closest to the receiver.

Characteristics of the motion of the focus lens can be adjusted (e.g., span, oscillating frequency) to accommodate different configurations of receive lenses in the receive path without deviating from the scope of the present disclosure. For instance, in some embodiments, a first actuator can be configured to impart a first motion (e.g., first oscillating motion) to the first axis collimating lens in the transmit path. A second actuator can be configured to impart a second motion (e.g., second oscillating motion) to the focus lens in the receive path. A span of the second motion can be greater or less than a span of the first motion to synchronize focusing of return signals on the receiver with position of the transmit signal in the surrounding environment.

Example aspects of the present disclosure are directed to a method for scanning a surrounding environment using a LIDAR system. The method can include, for instance, emitting a light signal from an emitter through one or more transmit lenses along a transmit path to provide a transmit signal into a surrounding environment. For instance, emitting a light signal can include emitting a light signal having a first divergence along a first axis and a second divergence along a second axis. The first divergence can be different from the second divergence.

The method can include imparting a first motion to the one or more transmit lenses to provide for steering of the transmit signal in the surrounding environment. For instance, the one or more transmit lenses can include a first axis collimating lens and a second axis collimating lens. The first axis collimating lens can be configured to act primarily on the first axis of the light signal and the second axis collimating lens can be configured to act primarily on the second axis of the light signal. In some implementations, imparting the first motion can include imparting a first oscillating motion to the first axis collimating lens, for instance, along the first axis. In some embodiments, the method can include imparting motion (e.g., an oscillating motion) to the second axis collimating lens along the second axis to provide for steering of the transmit signal along multiple axes.

The method can include imparting a second motion to one or more receive lenses disposed along a receive path. For instance, the one or more receive lenses can include a focus lens operable to focus a return signal onto the receiver. The method can include imparting the second motion to the focus lens. The second motion can include characteristics (e.g., frequency and/or span) that are approximately equal to or are different from characteristics of the first motion.

The method can include detecting, at a receiver, the return signal. The return signal can be received via the one or more receive lenses disposed along the receive path. In some embodiments, the method can include providing data indicative of the return signal for generation of a point cloud (e.g., by a vehicle computing system of an autonomous vehicle).

In some embodiments, the method can include varying characteristics of the first motion (e.g., first oscillating motion) and/or the second motion (e.g., second oscillating motion) depending on characteristics of the surrounding environment and/or operation of an autonomous vehicle. For instance, the frequency of the first oscillating motion and/or the second oscillating motion can be determined based at least in part on a speed of the autonomous vehicle so that the frequency of scanning of the transmit signal is selected to sweep at a particular rate appropriate for the speed of the autonomous vehicle. As another example, the frequency of the first oscillating motion and/or the second oscillating motion can be determined based at least in part on a density of objects in the surround environment to provide for increased scanning frequency in surrounding environments with a dense population of objects (e.g., an urban environment) relative to a scanning frequency in surrounding environments with a less dense or sparse population of objects (e.g., a rural environment). In this way, the density and/or resolution of data points in a point cloud generated from a LIDAR system according to example aspects of the present disclosure can be reduced and/or preserved in circumstances where they are not needed, allowing for preservation of computing resources of other functions of the LIDAR system and/or autonomous vehicle.

In some embodiments, a LIDAR system can include a plurality of channels. Each channel can include an emitter configured to transmit a light signal along a transmit path to provide a transmit signal and a receiver configured to receive return signals corresponding to reflections of the transmit signal via a receive path. In some implementations, each of the plurality of channels can share a common second axis collimating lens in the transmit path. However, each of the plurality of channels can include individual or separate first axis collimating lenses in the transmit path. A common or shared actuator can be configured to impart motion (e.g., an oscillating motion) with similar characteristics (e.g., frequency and span) to each of the first axis collimating lenses. However, each of the first axis collimating lenses can be oriented in different directions and/or at different angles relative to its corresponding emitter to provide increased density and diversity of locations of transmit signals into the surrounding environment.

An autonomous vehicle can utilize the described LIDAR system to obtain increased sensor data (e.g., data points in a point cloud) for object(s) within a field of view with the LIDAR system during autonomous operation. For instance, an autonomous vehicle (e.g., its onboard computing system) can obtain sensor data via the LIDAR system. The sensor data can be indicative of an object within a field of view associated with the LIDAR system. The autonomous vehicle can determine perception data for the object within the field of view associated with the LIDAR system based at least in part on the sensor data. The perception data can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class); and/or other state information. The autonomous vehicle can determine future location(s) of the object based at least in part on the perception data. For example, the autonomous vehicle can generate a trajectory (e.g., including one or more waypoints) that is indicative of a predicted future motion of the object, given the object's heading, velocity, type, etc. over current/previous timestep(s). The autonomous vehicle can determine an action for the autonomous vehicle based at least in part on the detected object and/or the future location(s) of the object within the field of view associated with the LIDAR system. For example, the autonomous vehicle can generate a motion plan that includes a vehicle trajectory by which the vehicle can travel to avoid interfering/colliding with the object. In another example, the autonomous vehicle can determine that the object is a user that intends to enter the autonomous vehicle (e.g., for a human transportation service) and/or that intends to place an item in the autonomous vehicle (e.g., for a courier/delivery service). The autonomous vehicle can unlock a door, trunk, etc. to allow the user to enter and/or place an item within the vehicle. The autonomous vehicle can communicate one or more control signals (e.g., to a motion control system, door control system, etc.) to initiate the determined actions.

The LIDAR systems and methods in accordance with the present disclosure can provide numerous technical effects and benefits. For example, the sweeping of transmit signals described herein can provide for increased scanning resolution of transmit signals in a surrounding environment using simple actuation of lenses. This can lead to the generation of more robust (e.g., denser, high resolution) point clouds obtained by the LIDAR system. The more robust point clouds can be used, for instance, for enhanced object detection by autonomous vehicles and determining of motion plans for autonomous vehicles. Moreover, the sweeping of transmit signals can be accomplished using simple actuation of lenses within a laser cavity associated with a channel of a LIDAR system without having to rely on complex optical arrangement.

Referring now to the FIGS., FIG. 1 depicts a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; perception data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 108 and/or its users to coordinate a vehicle service provided by the vehicle 108. To do so, the operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or a state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, an acceleration, a trajectory, a heading, and/or a path of the vehicle 108 based, at least in part, on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane, vertical take-off and lift aircraft, or helicopter, unmanned aerial vehicle), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a manual operating mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. A manual operating mode can be one in which a human driver present in the autonomous vehicle manually controls (e.g., acceleration, braking, steering) the vehicle 108 via one or more vehicle control devices (e.g., steering device) of the vehicle 108. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, as discussed above, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104 and/or the remote computing devices 106, which can store an indication, record, and/or other data indicative of the state of the one or more objects within a predefined distance of the vehicle 108 in one or more memory devices associated with the operations computing system 104 and/or the one or more remote computing devices 106 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein for accessing state data including information associated with one or more respective locations and/or characteristics of one or more objects over a plurality of time intervals and/or determining, based at least in part on the state data and a machine-learned prediction generator model, one or more predicted trajectories of the one or more objects at one or more subsequent time intervals following the plurality of time intervals. Furthermore, the vehicle computing system 112 can perform one or more operations associated with the control, exchange of data, and/or operation of various devices and systems including robotic devices and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects proximate to the vehicle 108 (e.g., within range or a field of view of one or more of the one or more sensors 114). The one or more sensors 114 can include one or more Light Detection and Ranging (LIDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LIDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of a location of the one or more objects within the surrounding environment of the vehicle 108 at one or more times. For example, sensor data 116 can be indicative of one or more LIDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data, including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing devices 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LIDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain perception data 130 descriptive of a current and/or past state of an object that is proximate to the vehicle 108. The perception data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the perception data 130 to the prediction system 126 (e.g., for predicting the movement of an object). In some implementations, the functionality of the perception and prediction system (and/or another system) can be included in the same system and/or share computing resources.

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction model. For example, the prediction system 126 can receive perception data 130 (e.g., from the perception system 124) associated with one or more objects within the surrounding environment of the vehicle 108. The prediction system 126 can input the perception data 130 (e.g., BEV image, LIDAR data, etc.) into the machine-learned prediction model to determine trajectories of the one or more objects based on the perception data 130 associated with each object. For example, the machine-learned prediction model can be previously trained to output a future trajectory (e.g., a future path, one or more future geographic locations, etc.) of an object within a surrounding environment of the vehicle 108. In this manner, the prediction system 126 can determine the future trajectory of the object within the surrounding environment of the vehicle 108 based, at least in part, on the machine-learned prediction generator model.

As discussed above, the machine-learned prediction model can be previously trained via one or more machine-learning techniques. In some implementations, the machine-learned prediction model can be previously trained by one or more devices (e.g., training computing system, operations computing system 104, one or more remote computing devices 106, etc.) remote from the vehicle 108.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. In some implementations, the mobility controller can translate determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also he configured to enable the autonomous vehicle to communicate with and/or provide and/or receive data and/or signals from a remote computing device 106 associated with a user and/or an item (e.g., an item to he picked up for a courier service). The communications system 136 can utilize various communication technologies including, for example, radio frequency signaling and/or Bluetooth® low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces.

In some implementations, the vehicle computing system 112 can perform one or more operations including activating, based at least in part on one or more signals or data (e.g., the sensor data 116, the map data 122, the perception data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
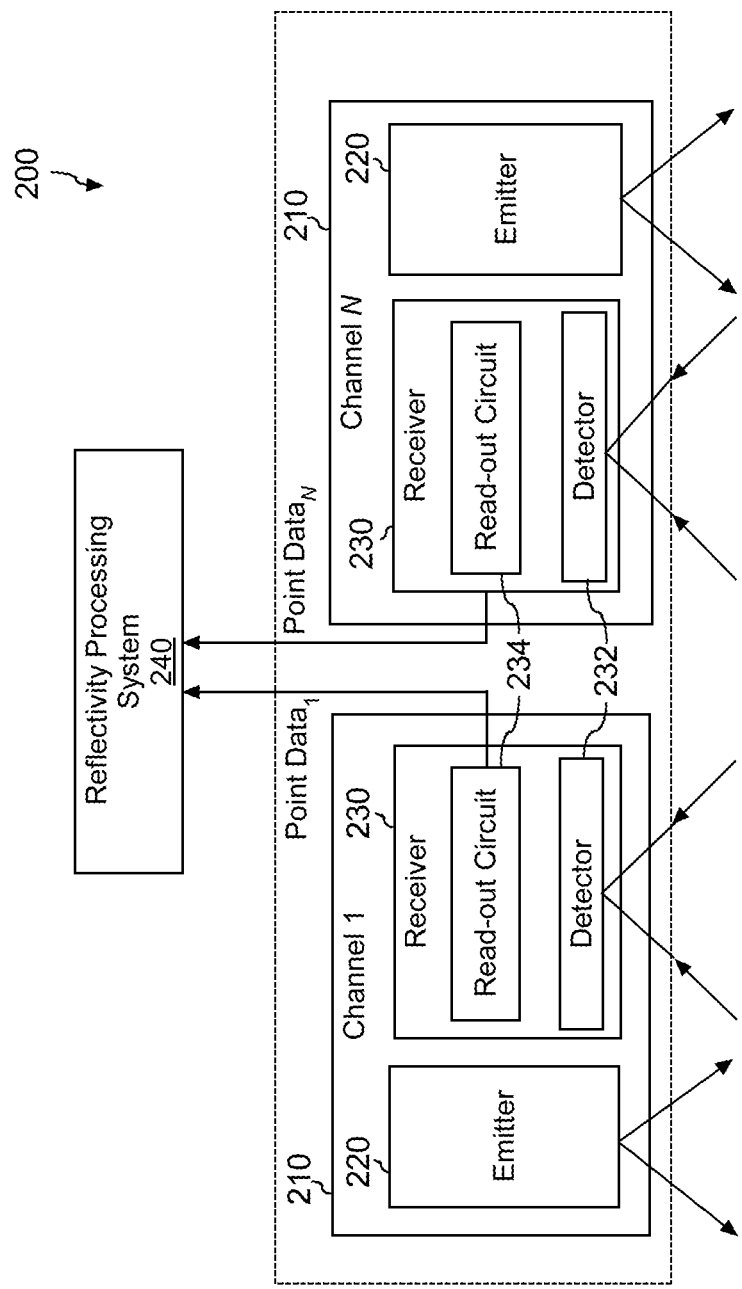
FIG. 2 depicts a block diagram of components of an autonomous vehicle according to example embodiments of the present disclosure.

Referring now to FIG. 2, a block diagram of a LIDAR system 200 is provided according to example embodiments of the present disclosure. It should be understood that the LIDAR system 200 can be included as part of the sensor(s) 114 discussed above with reference to FIG. 1. As shown, the LIDAR system 200 can include multiple channels 210; specifically, channels 1-N are illustrated. The LIDAR system 200 can include one or more LIDAR units. Thus, the channels 1-N can be included in a single LIDAR unit or may be spread across multiple LIDAR units. Each channel 210 can output point data that provides a single point of ranging information. The point data output by each of the channels 210 (i.e., point data$_{1-N}$) can combined to create a point cloud that corresponds to a three-dimensional representation of the surrounding environment.

As shown, each channel 210 can include an emitter 220 paired with a receiver 230. The emitter 220 emits a laser signal into the environment that is reflected off the surrounding environment and returned back to a detector 232 (e.g., an optical detector) of the receiver 230. Each emitter 220 can have an adjustable power level that controls an intensity of the emitted laser signal. The adjustable power level allows the emitter 220 to be capable of emitting the laser signal at one of multiple different power levels (e.g., intensities).

The detector 232 can provide the return signal to a read-out circuit 234. The read-out circuit 234 can, in turn, output the point data based on the return signal. The point data can indicate a distance the LIDAR system 200 is from a detected object (e.g., road, pedestrian, vehicle, etc.) that is determined by the read-out circuit 234 by measuring time-of-flight (ToF), which is the time elapsed time between the emitter 220 emitting the laser signal and the receiver 230 detecting the return signal.

The point data further includes an intensity value corresponding to each return signal. The intensity value indicates a measure of intensity of the return signal determined by the read-out circuit 234. As noted above, the intensity of the return signal provides information about the surface reflecting the signal and can be used by the autonomy computing system 120 (FIG. 1) for localization, perception, prediction, motion planning, etc. The intensity of the return signals depends on a number of factors, such as the distance of the LIDAR system 200 to the detected object, the angle of incidence at which the emitter 220 emits the laser signal, temperature of the surrounding environment, the alignment of the emitter 220 and the receiver 230, and the reflectivity of the detected surface.

As shown, a reflectivity processing system 240 receives the point data from the LIDAR system 200 and processes the point data to classify specular reflectivity characteristics of objects. The reflectivity processing system 240 classifies the specular reflectivity characteristics of objects based on a comparison of reflectivity values derived from intensity values of return signals. In some embodiments, the LIDAR system 200 can be calibrated to produce the reflectivity values. For example, the read-out circuit 234 or another component of the LIDAR system 200 can be configured to normalize the intensity values to produce the reflectivity values. In these embodiments, the reflectivity values may be included in the point data received by the reflectivity processing system 240 from the LIDAR system 200. In other embodiments, the reflectivity processing system 240 may generate the reflectivity values based on intensity return values included in the point data received from the LIDAR system 200.

Regardless of which component is responsible for generating the reflectivity values, the process for doing so may, in some embodiments, include using a linear model to compute one or more calibration multipliers and one or more bias values to be applied to return intensity values. Depending on the embodiment, a calibration multiplier and bias value may be computed for and applied to each channel of the LIDAR system 200 at each power level. The linear model assumes a uniform diffuse reflectivity for all surfaces and describes an expected intensity value as a function of a raw intensity variable, a calibration multiplier variable, and/or a bias variable. The computing of the calibration multiplier and bias value for each channel/power level combination includes determining a median intensity value based on the raw intensity values output by the channel at the power level and using the median intensity value as the expected intensity value in the linear model while optimizing values for the calibration multiplier variable and bias variable. As an example, the calibration multiplier and bias value may be computed by solving the linear model using an Iterated Re-weighted Least Squares approach.

The calibration multiplier and bias value computed for each channel 210 at each power level can be assigned to the corresponding channel/power level combination. In this way, each power level of each channel of the LIDAR system 200 can have an independently assigned calibration multiplier and bias value from which reflectivity values may be derived. Once assigned, the calibration multiplier and bias value of each channel/power level combination can be used at run-time to determine reflectivity values from subsequent intensity values produced by the corresponding channel at the corresponding power level during operation of an autonomous or semi-autonomous vehicle. More specifically, reflectivity values can be determined from the linear model by using the value of the calibration multiplier and the bias value for the calibration multiplier variable and bias variable, respectively. In this manner, the intensity values can be normalized to be more aligned with the reflectivity of a surface by taking into account factors such as the distance of the LIDAR system 200 to the detected surface, the angle of incidence at which the emitter 220 emits the laser signal, temperature of the surrounding environment, and/or the alignment of the emitter 220 and the receiver 230.

Figure 3:
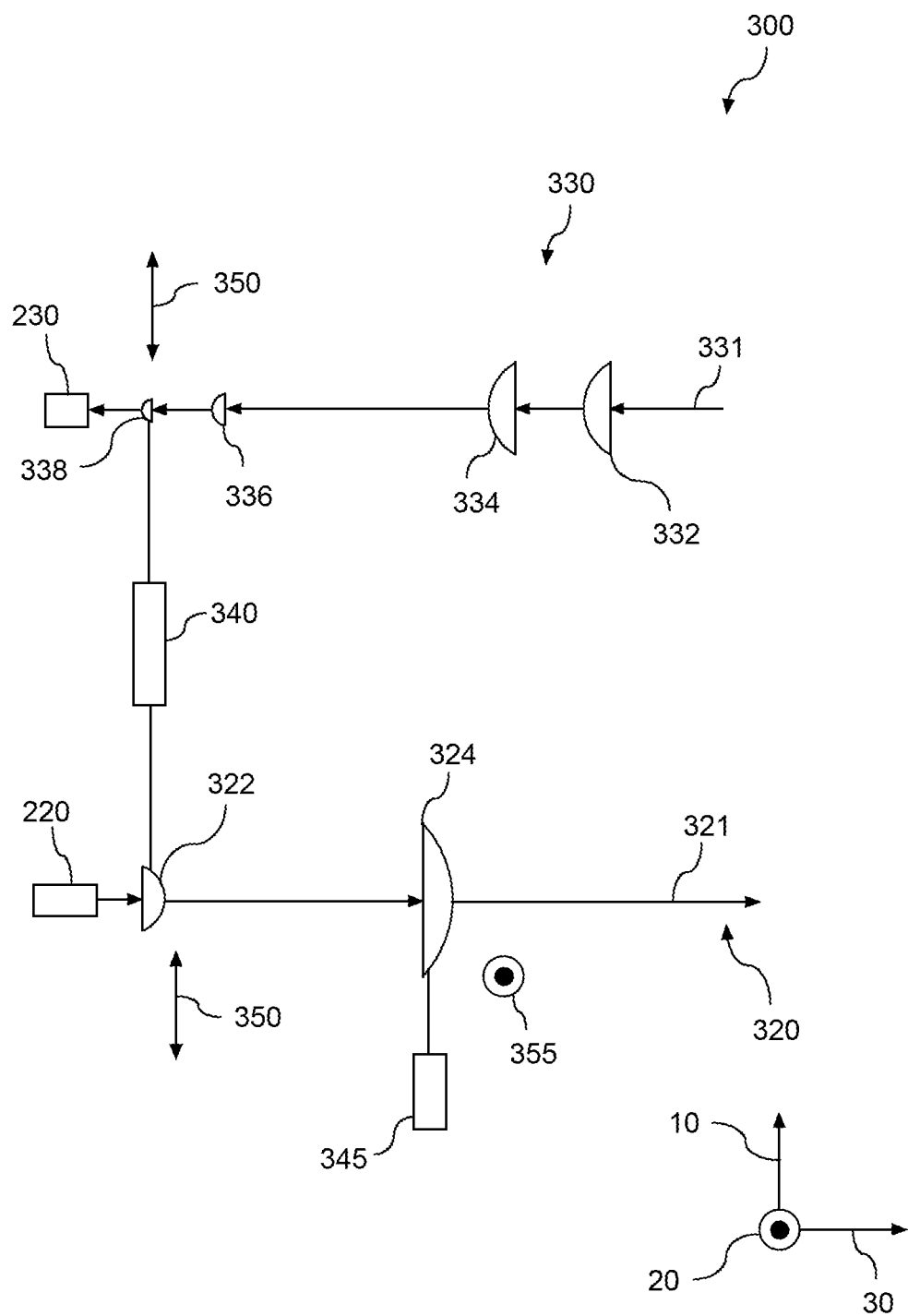
FIG. 3 depicts an example transmit path and a receive path of a channel of a LIDAR system according to example embodiments of the present disclosure.

Referring now to FIG. 3, the transmit path 320 and the receive path 330 of a channel 300 of the LIDAR system 200 are provided according to example embodiments of the present disclosure. As shown, each LIDAR channel 300 can have an emitter 220 and a receiver 230. The emitter 220 can include a light source configured to emit a light signal through one or more transmit lenses along a transmit path 320. In some embodiments, the light source can be, for instance, a laser diode. The transmit lenses shape the light signal for propagation over distance as the transmit signal 321 for the LIDAR system 200.

Figure 4:
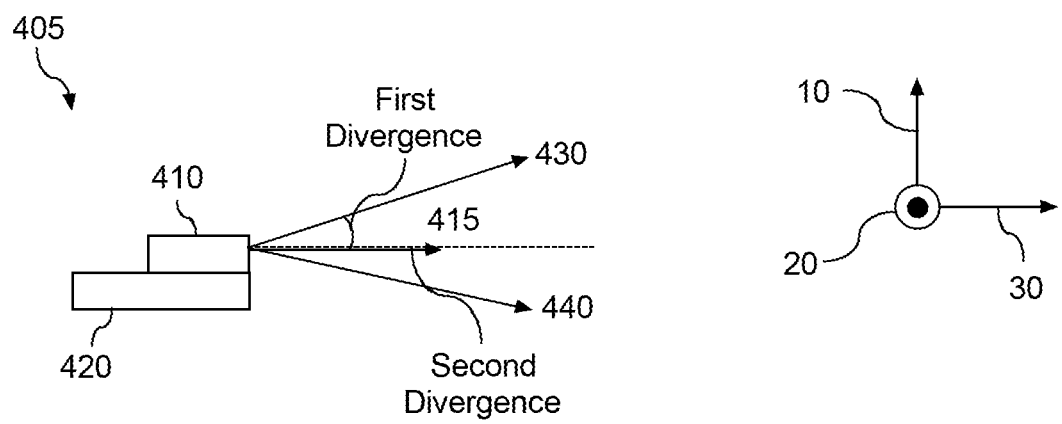
FIG. 4 depicts an emitter operable to emit a light signal according to example embodiments of the present disclosure.

FIG. 4 depicts the components of an emitter 220 operable to emit a light signal 415 according to example embodiments of the present disclosure. In some implementations, the emitter 220 can be a light source 405 configured to emit a light signal 415. In example embodiment as shown, the light source 405 can include a laser diode 410 coupled to a PCB 420 and configured to emit the light source 415. The light source 405 can emit a light signal 415 of varying divergence along different axes. For example, the light signal 415 can have a first divergence 430 along a first axis 10 relative to the laser diode 410. The light signal 415 can have a second divergence 440 along the second axis 20 relative to the laser diode 410. In some embodiments, the first axis 10 and the second axis 20 can be perpendicular or near perpendicular (e.g., within 5° of perpendicular, etc.).

The divergence along an axis can be indicative of an increase in beam diameter or radius of the light signal 415 along the axis with distance from the light source 405. For instance, a first divergence 430 associated with a vertical axis 10 can be indicative of an increase in beam diameter or radius of the light signal 415 along the vertical axis 10 with distance from the light source 405. A second divergence 440 associated with a horizontal axis 20 can be indicative of an increase in beam diameter or radius of the light signal 415 along the horizontal axis 20 with distance from the light source 405. In some implementations, the first divergence 430 of the light signal 415 along the first axis (e.g., vertical axis) 10 can be different than the second divergence 440 of the light signal 415 along the second axis (e.g., horizontal axis) 20. For instance, the second divergence 440 can be greater than the first divergence 430, or vice versa.

Referring back to FIG. 3, in some implementations, the one or more transmit lenses can include a first axis collimating lens (e.g., fast axis collimating lens) 322 and a second axis collimating lens (e.g., slow axis collimating lens) 324. The first axis collimating lens 322 can be an astigmatic lens configured to act or have optical power primarily on the first axis (e.g., the vertical axis) 10 such that the first axis collimating lens 322 collimates light at a maximum along the first axis 10 and at a minimum along the second axis 20. The second axis collimating lens 324 can be an astigmatic lens configured to act or have optical power primarily on the second axis (e.g., the horizontal axis) 20 such that the second axis collimating lens 324 collimates light at a maximum along the second axis 20 and at a minimum along the first axis 10. Passing the light signal through the first axis collimating lens 322 and the second axis collimating lens 324 can result in the transmit signal 321 of a channel 300 of the LIDAR system 200 having a square or nearly square profile, despite the varying divergence along the first axis 10 and the second axis 20 of the light signal from the light source.

In some implementations, the second axis collimating lens 324 can be separated from the first axis collimating lens 322 by a distance along the transmit path 320. The first axis collimating lens 322 can be located closer to the emitter 220 of the light signal. In particular, the first axis collimating lens 322 can be disposed between the emitter 220 and the second axis collimating lens 324 on the transmit path 320. Furthermore, although the LIDAR channel 300 in FIG. 2 is depicted as having two lenses (e.g., first collimating lens 322 and second collimating lens 324) disposed along the transmit path 320, it should be understood that the LIDAR channel 300 can include more or fewer lenses disposed along the transmit path 320. For instance, in some implementations, the LIDAR channel 300 can include only the first axis collimating lens 322 disposed along the transmit path 320. In some implementations, the LIDAR channel 300 can include only the second axis collimating lens 324 disposed along the transmit path 320. In alternative implementations, the LIDAR channel 300 can include more than two lenses disposed along the transmit path 320.

In some embodiments, the distance between the first axis collimating lens 322 and the second axis collimating lens 324 can be determined as a function of a shape of the emitter 220. As one example, for rectangle shaped emitters, the distance between the first axis collimating lens and the second axis collimating lens can be determined as a function of a ratio of a width of the rectangle emitter (short dimension) relative to the length of the rectangle emitter (long dimension). In some embodiments, the distance between the first axis collimating lens 322 and the second axis collimating lens 324 can be the range of about 60 mm to about 140 mm.

In some implementations, the LIDAR system 200 can include an actuator 340 operable to impart motion to the first axis collimating lens 322 and/or the second axis collimating lens 324. In some implementations, the actuator 340 may be a piezoelectric device. Alternatively, the actuator 340 may be a linear solenoid actuator. The actuator 340 may be any actuator suitable to impart motion to a lens.

In some embodiments, an actuator 340 can be configured to impart a first motion 350 to the first axis collimating lens 322 by, for example, imparting an oscillating motion (e.g., a first oscillation motion) to the first axis collimating lens 322 along the first axis (e.g., the vertical axis) 10. In this embodiment, the actuator 340 can oscillate the first axis collimating lens 322 up and down in the vertical direction. The motion of the first axis collimating lens 322 can result in steering of the transmit signal 321 in the surrounding environment along the first axis (e.g., vertical axis) 10. In another embodiment, the actuator 340 can be configured to impart a second motion 355 to the second axis collimating lens 324 by imparting an oscillating motion (e.g., a second oscillating motion) to the second axis lens 324 along the second axis (e.g., the horizontal axis) 20.

Figure 5:
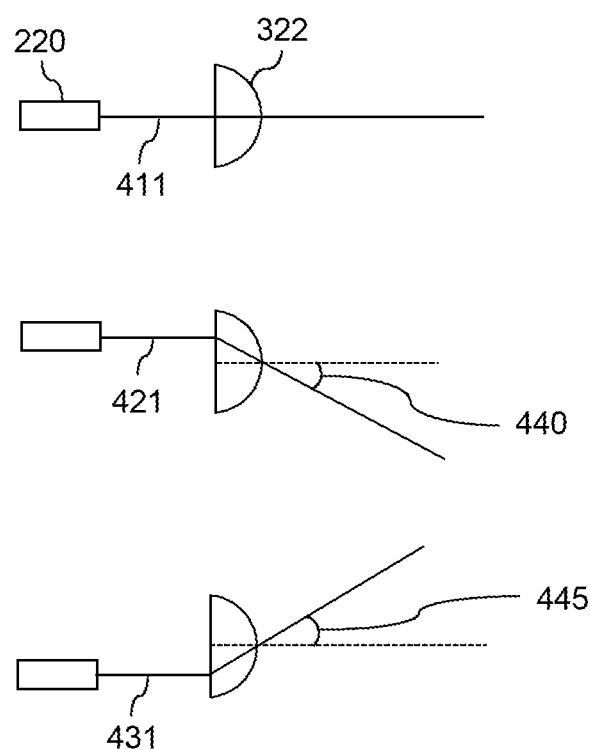
FIG. 5 depicts imparting motion to a first axis collimating lens according to example embodiments of the present disclosure.

Turning now to FIG. 5, varying steering angles resulting from imparting motion to a first axis collimating lens 322 according to example embodiments of the present disclosure are shown. As disclosed above, in some embodiments, an actuator 340 can be configured to impart motion to the first axis collimating lens 322 by imparting an oscillating motion to the first axis lens 322 along the first axis (e.g., the vertical axis) 10. In this embodiment, the actuator 340 can oscillate the first axis collimating lens 322 up and down in the vertical direction. The adjustment of the first axis collimating lens 322 up and down will result in steering of the transmit signal 321 in the surrounding environment along the first axis (e.g., vertical axis) 10.

In this example embodiment, when the first axis collimating lens 322 is in a center position of an oscillating motion along the first axis 10, the emitter 220 emits the light signal 415 through the center 411 of the first collimating lens 322 such that the transmit signal 321 travels approximately straight along the third axis 30. When the first collimating lens 322 is in its lowest position 421 during the oscillation motion, the transmit signal 321 is emitted at a downward angle relative to the third axis 30. With the first collimating lens 322 in its lowest position 421, the transmit signal 321 can sweep lower regions of the surround environment. When the first collimating lens 322 is in its highest position 431 during the oscillating motion, the transmit signal 321 is emitted at an upward angle relative to the third axis 30. With the first collimating lens 322 in its highest position 431, the transmit signal 321 can sweep upper regions of the surrounding environment. By emitting the light signal 415 through the first collimating lens 322 at varying positions due to the motion 350 of an actuator 340, the resulting transmit signal 321 can be swept through the surrounding environment.

Figure 6:
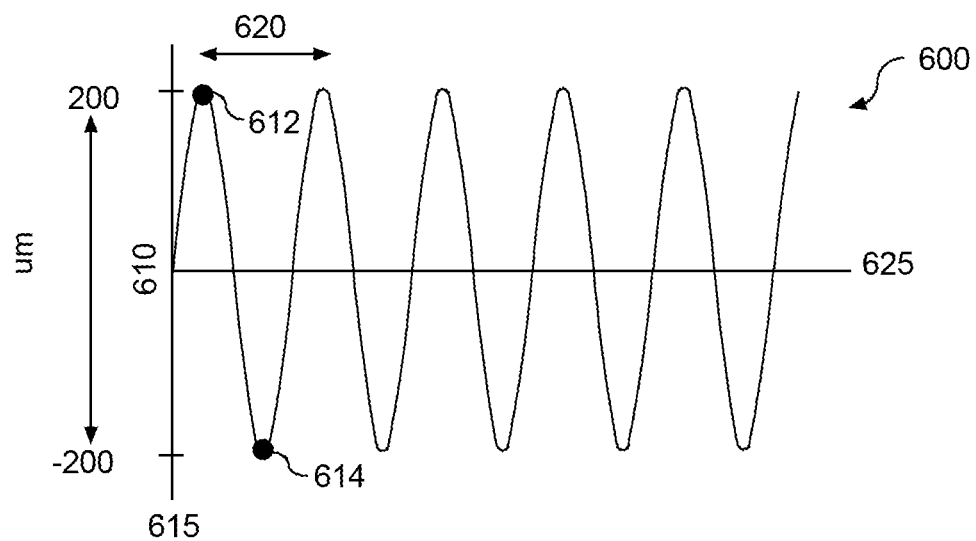
FIG. 6 depicts characteristics of an example oscillating motion imparted to one or more lenses according to example embodiments of the present disclosure.

FIG. 6 depicts characteristics of an example oscillating motion 600 imparted to one or more lenses according to example embodiments of the present disclosure. The oscillating motion 600 can have a span 610. The span 610 is calculated as the distance between a maximum point 612 of the oscillating motion 600 and a minimum point 614 of the oscillating motion 600 along the first axis 615. In some example embodiments, the span can range from about 100 microns to about 700 microns.

In addition to its span, the oscillating motion 600 can be described by its frequency. The period 620 of the oscillating motion 600 can be defined as the time it takes for the motion to repeat itself. The reciprocal of the period 620 provides the oscillation frequency, or the number of oscillation cycles per unit time measured along the second axis 625. Frequency can be measured in Hz, with one Hz equal to one oscillation cycle per second. In some example embodiments, the oscillation frequency can be in the range of about 1 kHz to about 200 kHz.

Aspects of the present disclosure are discussed with reference to an oscillating motion for purposes of illustration and discussion of example embodiments. Those of ordinary skill in the art, using the disclosures provided herein, will understand that other types of motion and/or variations of an oscillating motion can be imparted to the one or more lenses in the receive path and/or the transmit path without deviating from the scope of the present disclosure. For instance, the oscillating motion can be dynamically changed during the steering for focusing purposes. A LIDAR system can have the ability to focus transmit signals and/or receive signals on specific areas within the field of view. As one example, a mid-range LIDAR system can have the ability to focus transmit signals and/or return signals within a narrow angular range on a highway to accommodate faster driving speeds.

Figure 7:
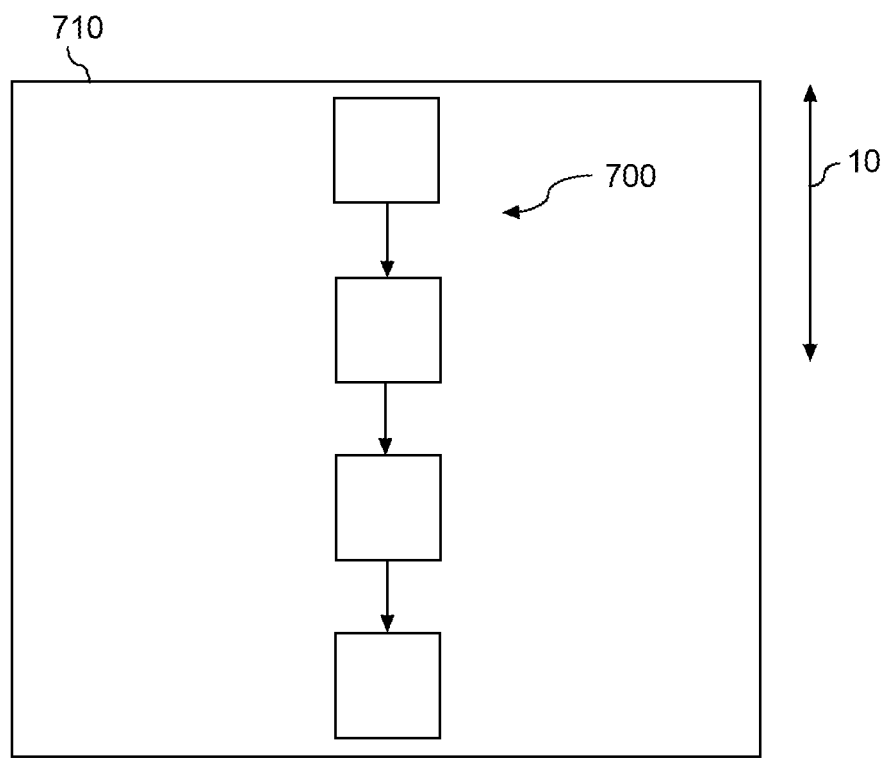
FIG. 7 depicts the sweeping of a transmit signal along an axis according to example embodiments of the present disclosure.

FIG. 7 depicts the sweeping of a transmit signal 700 in a surrounding environment 710 along the first axis 10 according to example embodiments of the present disclosure. In some implementations, as shown, the LIDAR system 200 can be configured to provide for sweeping of a transmit signal 700 along the first axis (e.g., vertical axis) 10 in the surrounding environment 710. In this implementation, an actuator 340 coupled to the first axis collimating lens 322 can impart an oscillating motion to the first axis collimating lens 322 along the first axis 10 to provide for sweeping of the transmit signal 700 along the first axis 10 in the surrounding environment 710. The oscillation motion can have various characteristics to provide for a continuous and fast sweep of the transmit signal 700 along the first axis 10 in the field of view in the surrounding environment 710.

Referring back to FIG. 3, in some implementations, the LIDAR system 200 can be configured to provide for sweeping of the transmit signal 321 along multiple axes by imparting motion to a plurality of transmit lenses, such as sweeping of the transmit signal 321 along both a first axis (e.g., vertical axis) 10 and a second axis (e.g., horizontal axis) 20. For instance, the LIDAR system 200 can include a first actuator 340 coupled to the first axis collimating lens 322 and a second actuator 345 coupled to the second axis collimating lens 324. The first actuator 340 coupled to the first axis collimating lens 322 can impart a first motion 350 (e.g., first oscillating motion) to the first axis collimating lens 322 along the first axis (e.g., vertical axis) 10 to provide for sweeping of the transmit signal of the LIDAR system along the first axis 10 in the surrounding environment. The actuator 345 coupled to the second axis collimating lens 324 can impart a second motion 355 (e.g., second oscillating motion) to the second axis collimating lens 324 along the second axis 20 to provide for sweeping of the transmit signal of the LIDAR system along the second axis 20 (e.g., horizontal axis) in the surrounding environment.

Figure 8:
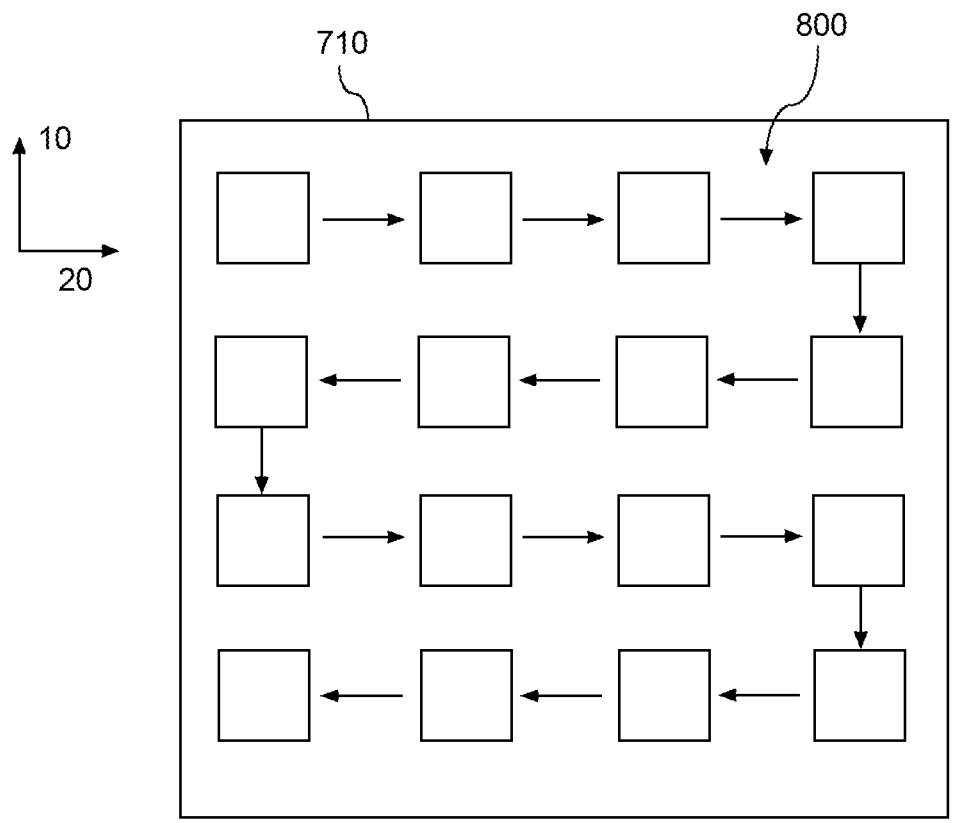
FIG. 8 depicts the sweeping of a transmit signal along multiple axes according to example embodiments of the present disclosure.

FIG. 8 depicts the sweeping of a transmit signal 800 along multiple axes according to example embodiments of the present disclosure. In some embodiments, the LIDAR system can be configured to provide for sweeping of the transmit beam 800 along multiple axes by imparting motion to a plurality of transmit lenses, such as sweeping of the transmit beam 800 along both a first axis (e.g., vertical axis) 10 and a second axis (e.g., horizontal axis) 20. For instance, the LIDAR system can include an actuator 340 coupled to the first axis collimating lens 322 and an actuator 345 coupled to the second axis collimating lens 324.

The actuator 340 coupled to the first axis collimating lens 322 can impart a first oscillating motion 350 to the first axis collimating lens 322 along the first axis 10 to provide for sweeping of the transmit signal 800 of the LIDAR system 200 along the first axis 10 in the surrounding environment 710. The actuator 345 coupled to the second axis collimating lens 324 can impart a second oscillating motion 355 to the second axis collimating lens 324 along the second axis 20 to provide for sweeping of the transmit signal 800 of the LIDAR system 200 along the second axis 20 in the surrounding environment 710.

The second oscillating motion can include characteristics such as span and/or frequency that are approximately equal to characteristics of the first oscillating motion. Alternatively, the second oscillating motion can include characteristics that are different from characteristics of the first oscillating motion.

Aspects of the present disclosure are discussed with reference to sweeping a transmit signal 321 along a vertical axis 10 and/or a horizontal axis 20 for purposes of illustration and discussion. Those of ordinary skill in the art, using the disclosures provided herein, will understand that the transmit signal can be moved in any direction(s) or axis(s) without deviating from the scope of the present disclosure.

Referring back to FIG. 3, each channel 300 of the LIDAR system 200 can also include a receiver 230. As shown, the receiver 230 can be spaced apart from the emitter 220. In some implementations, the emitter 220 and the receiver 230 can be coupled to a vehicle body of the autonomous vehicle 108 such that the emitter 220 and the receiver 230 are spaced apart from one another along a vertical direction of the autonomous vehicle 108 (FIG. 1) or a lateral direction of the autonomous vehicle 108. In particular, the emitter 220 and the receiver 230 can be positioned on the autonomous vehicle 108 such that the emitter 220 and the receiver 230 are parallel to one another.

The receiver 230 can be, for instance, a detector (e.g., an avalanche photodiode) operable to detect return signals 331. The return signals 331 can correspond to reflected transmit signals 321 from surfaces in the surrounding environment. The receiver 230 can receive the return signal 331 through one or more receive lenses disposed along a receive path 330. The one or more receive lenses can be configured to focus the return signal 331 onto the receiver 230. In some embodiments, the one or more receive lenses can include one or more first axis toroidal lenses 332 and one or more second axis toroidal lenses 334. In some implementations, the receive path 330 can include a first axis toroidal lens 332, a second axis toroidal lens 334, a middle toroidal lens 336, a focus lens 338 and the receiver 230 disposed along a receive path 330. In particular, the middle toroidal lens 336 and the second axis toroidal lens can be positioned between the focus lens 338 and the first axis toroidal lens 332 along the receive path 330. Further, in some implementations, the second axis toroidal lens 334 can be positioned at a distance closer to the first axis toroidal lens 332 compared to its distance from the focus lens 338, and the middle toroidal lens 336 can be positioned a distance closer to the focus lens 338.

The first axis toroidal lens(s) 332 can be an astigmatic lens configured to act or have optical power primarily on the first axis (e.g., the vertical axis) 10 such that the first axis toroidal lens 332 focuses light at a maximum along the first axis 10 and at a minimum along the second axis 20. The second axis toroidal lens(s) 334 can be an astigmatic lens configured to act or have optical power primarily on the second axis (e.g., the horizontal axis) 20 such that the second axis toroidal lens 334 focuses light at a maximum along the second axis 20 and at a minimum along the first axis 10.

The focus lens 338 can be located closest to the receiver 230. The focus lens 338 can perform the final focusing of the return signal 331 onto the receiver 230. In some embodiments, an actuator 340 can be configured to impart motion (e.g., an oscillating motion 350) along the first axis 10 to the focus lens 338. This can synchronize the focusing of the return signal 331 on to the receiver 230 with a position of the corresponding transmit signal 321 during the sweeping of the transmit signal 321 along the first axis 10 in the surrounding environment.

In some embodiments, the actuator 340 used to impart motion to the first axis collimating lens 322 in the transmit path 320 can also be used to impart motion to the focus lens 338 in the receive path 330. In this particular implementation, the oscillating motion of the first axis collimating lens 322 can be similar to the oscillating motion of the focus lens 338. For instance, the oscillating motion of the first axis collimating lens 322 and the oscillating motion of the focus lens 338 can have a span and/or a frequency that are approximately equal. As used herein, the use of the term "approximately" or "about" in conjunction with a value refers to within 10% of the value.

In embodiments where the same actuator 340 is used for the first axis collimating lens 332 and the focus lens 338, the receive path 330 can include a particular arrangement of lenses such that similar oscillating motion can be imparted to first axis collimating lens 322 and the focus lens 338 to provide for synchronization between the transmit signal 321 and the return signal 331. For instance, the receive path 330 can include a first toroidal lens 332 operable to act on the second axis (e.g., the horizontal axis) 20. The receive path 330 can include a second toroidal lens 334 operable to act on the first axis (e.g., the vertical axis) 10. The receive path 330 can include a middle toroidal lens 336 operable to act on the first axis 10 located downstream in the receive path 330 relative to the first toroidal lens 332 and the second toroidal lens 334. The receive path 330 can include a focus lens 338 located downstream of the middle toroidal lens 336 and located closest to the receiver 230.

As described above, in some embodiments, there is a first and a second motion. In some implementations, the multiple actuators can all be coupled to lenses disposed on the transmit path 320 or the receive path 330. In other implantations, the multiple actuators can be coupled to lenses on both the transmit path 320 and the receive path 330.

Figure 9:
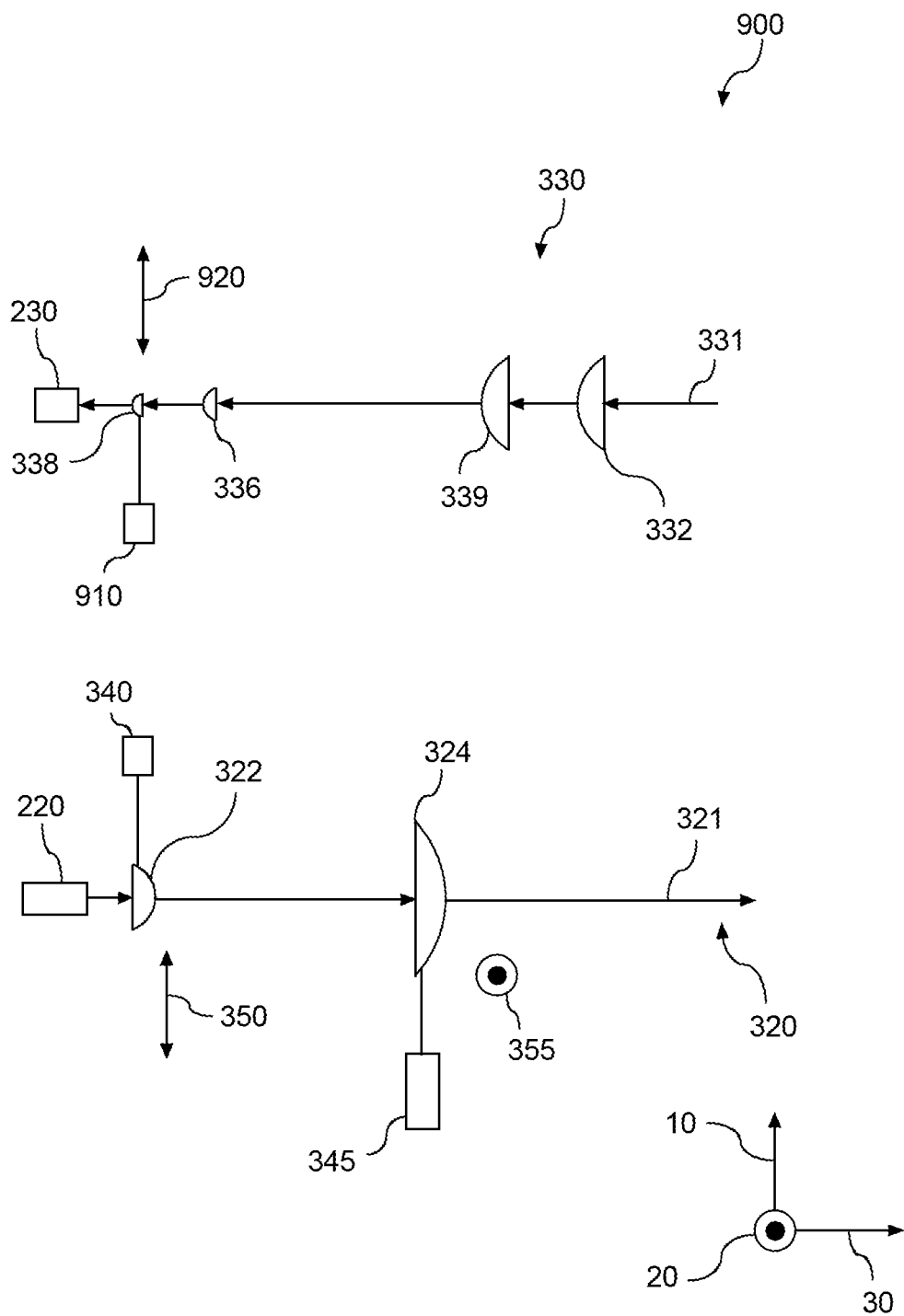
FIG. 9 depicts an example transmit path and a receive path of a channel of a LIDAR system according to example embodiments of the present disclosure.

Turning now to FIG. 9, an example channel 900 of a LIDAR system 200 with multiple actuators is shown according to example embodiments of the present disclosure. In the pictured embodiment, a first actuator 340 is coupled to the first axis collimating lens 322, a second actuator 345 is coupled to the second axis collimating lens 324, and a third actuator 910 is coupled to the focus lens 338. In this embodiment, the first actuator 340 can impart a first motion 350 (e.g., first oscillation motion) to the first axis collimating lens 322 along the first axis 10. The second actuator 345 can impart a second motion 355 (e.g., second oscillating motion) to the second axis collimating lens 324 along the second axis 20. The third actuator 910, can impart a third motion 920 (e.g., third oscillating motion) to the focus lens 228 along the first axis 10. The characteristics of the first motion 350 and the third motion 920 (e.g., frequency and span) can be similar.

In another implementation, a first actuator 340 is coupled to the one or more transmit lenses and a second actuator 345 is coupled to the one or more receive lenses. In another embodiment with multiple actuators, both actuators are coupled to the one or more transmit lenses. In this embodiment, the first actuator 340 is configured to impart motion to the first axis collimating lens 322 and the second actuator 345 is configured to impart motion to the second axis collimating lens 324. This configuration with multiple actuators provide for steering of the transmit signals into the surrounding environment.

Figure 10:
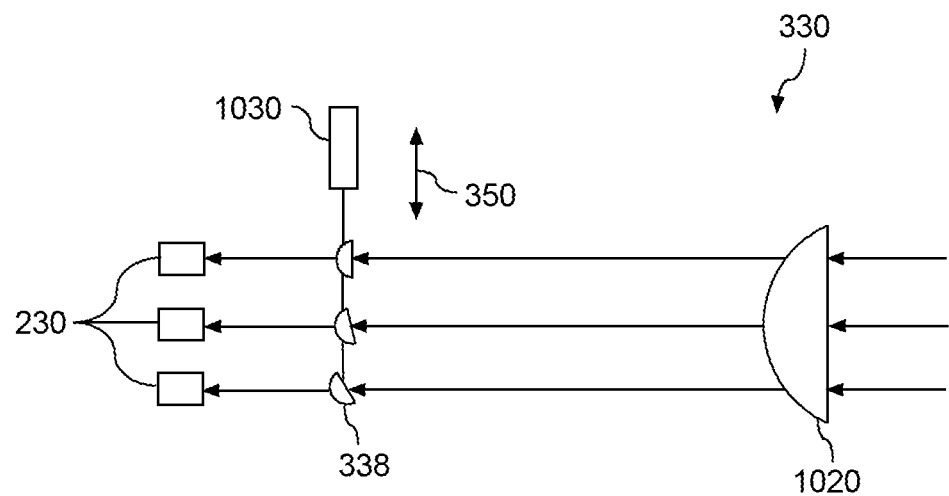
FIG. 10 depicts an example multichannel LIDAR system according to example embodiments of the present disclosure.
Figure 10:
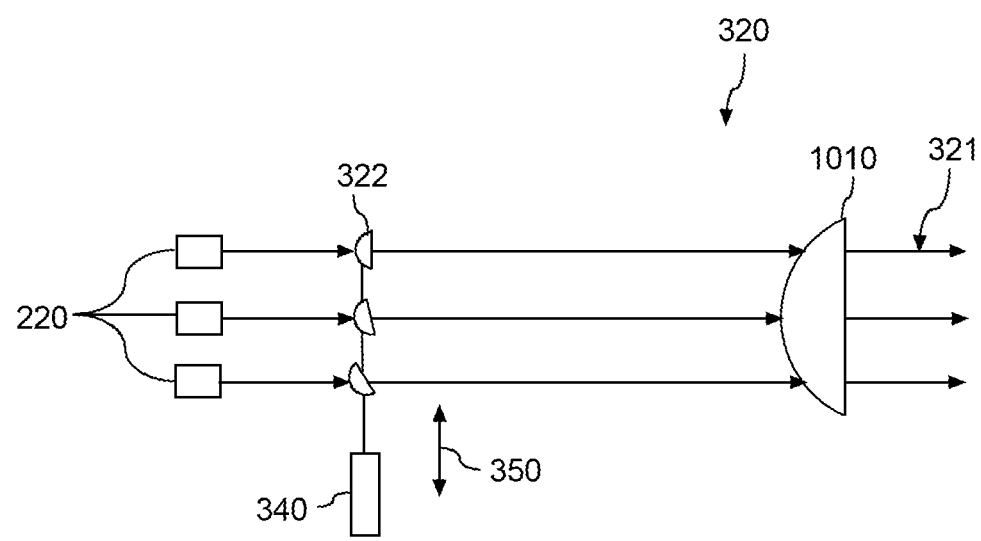

FIG. 10 depicts an example multichannel LIDAR system 1000 according to example embodiments of the present disclosure. While FIG. 10 depicts three channels, it should be understood that the multichannel LIDAR system 1000 can include any plurality of channels. Each of the plurality of channels can include an emitter 220 configured to transmit a light signal along the transmit path 320 to provide a transmit signal 321. As shown, each of the plurality of channels can have a separate first axis collimating lens 322. Additionally, each of the plurality of channels can share a common second axis collimating lens 1010 along the transmit path 320. A common shared actuator 340 may be configured to impart a motion with similar characteristics to each of the first axis collimating lenses 322. For example, the actuator 340 may impart an oscillation motion with similar frequency and span to each of the first axis collimating lenses 322. Each of the separate first axis collimating lenses 322 may be oriented in different directions and/or at different angles relative to its corresponding emitter 220 to provide increased density and diversity of locations of transmit signals 321 into the surrounding environment.

As shown, each of the plurality of channels can include a receiver 230 spaced out from the emitters 220. In some implementations, the emitter 220 and the receiver 230 can be coupled to a vehicle body of the autonomous vehicle such that the emitter 220 and the receiver 230 are spaced apart from one another along a vertical direction of the autonomous vehicle 108 (FIG. 1) or a lateral direction of the autonomous vehicle 108. In particular, the emitter 220 and the receiver 230 can be positioned on the autonomous vehicle 108 such that the emitter 220 and the receiver 230 are parallel to one another.

The receiver 230 can be configured to receive return signals 331 corresponding to reflections of the transmit signal 321 via the receive path 330. As shown, each of the plurality of channels can have a common toroidal lens 1020 and a focus lens 338 disposed along a receive path 330. The lenses (e.g., toroidal lens 1020, focus lenses 338) of the receiver 230 can receive the transmit signals 321 reflecting off one or more objects within a surrounding environment in which the LIDAR system 200 is operating.

As shown, each of the plurality of channels can have a separate focus lens 338. Additionally, each of the plurality of channels can share a common toroidal lens 1020. A common shared actuator 1030 may be configured to impart a motion with similar characteristics to each of the focus lenses 338. For example, the actuator 1030 may impart an oscillation motion with similar frequency and span to each of the focus lenses 338. Each of the separate focus lenses 338 may be oriented in different directions and/or at different angles relative to its corresponding receiver 230 to provide increased density and diversity of return signals received from the surrounding environment.

Figure 11:
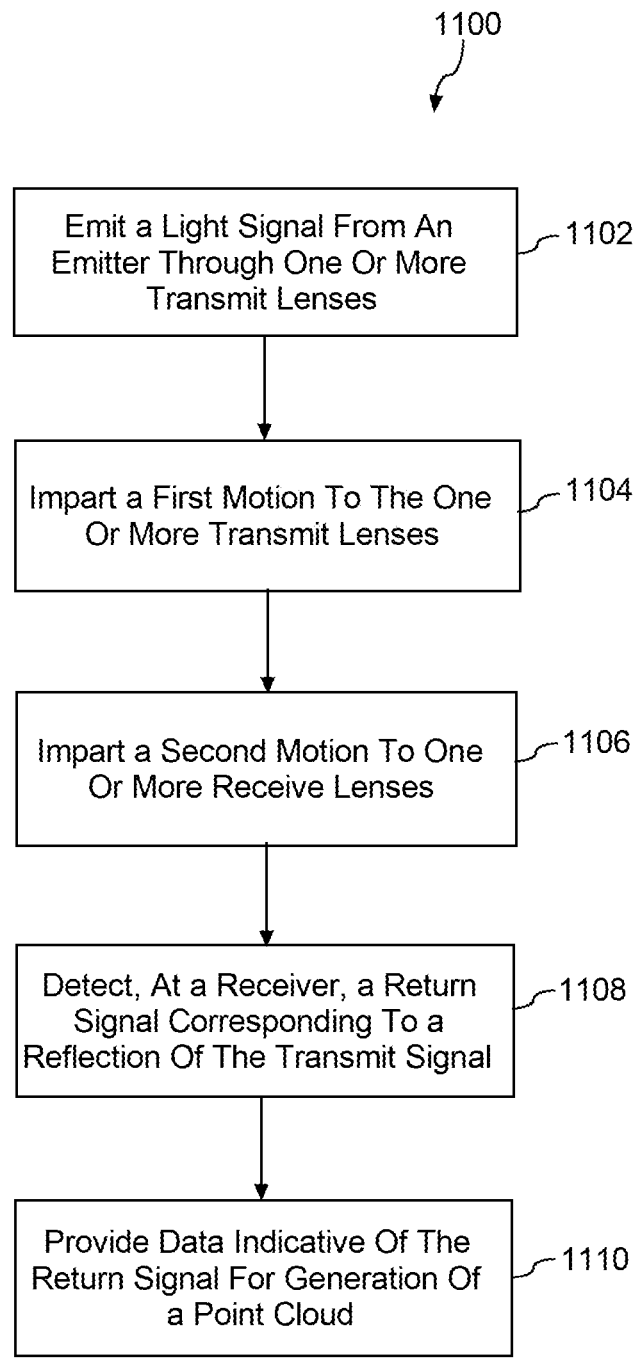
FIG. 11 depicts a flow diagram of an example method according to example embodiments of the present disclosure.

Referring now to FIG. 11, a flowchart diagram of an example method 1100 of scanning a surrounding environment using a LIDAR system is provided according to example embodiments of the present disclosure. The method 1100 can be implemented using the LIDAR system 200 discussed above with reference to FIGS. 3-10. Furthermore, FIG. 11 depicts elements performed in a particular order for purposes of illustration and discussion. Those of ordinary skill in the art, using the disclosures provided herein, will understand that the elements of any methods discussed herein can be adapted, include steps not illustrated, rearranged, expanded, omitted, combined, and/or modified in various ways without deviating from the scope of the present disclosure.

At (1102), the method 1100 can include emitting, via an emitter of the LIDAR system, a light signal through one or more transmit lenses along a transmit path to provide a transmit signal to the surrounding environment. In some implementations, the emitter of the LIDAR can include a light source configured to emit a light signal. For instance, the light source can include a laser diode. In some implementations, emitting the light signal can include emitting a light signal having a first divergence along a first axis and a second divergence along a second axis.

At (1104), the method 1100 can include imparting, via an actuator, a first motion (e.g., an oscillating motion) to the one or more transmit lenses disposed along a transmit path. In some implementations, the one or more transmit lenses can include a first axis collimating lens and a second axis collimating lens. In such implementations, the first axis collimating lens can be configured to act primarily on the first axis of the light signal and the second axis collimating lens can be configured to act primarily on the second axis of the light signal. In some implementations, the method 1100 at (1104) can include imparting the first oscillating motion to the first axis collimating lens, for instance, along the first axis. Alternatively, or additionally, the method 1100 at (1104) can include imparting the first oscillating motion to the second axis collimating lens along the second axis to provide for steering of the transmit signal along multiple axes.

At (1106), the method 1100 can include imparting, via an actuator, a second motion (e.g., an oscillating motion) to the one or more receive lenses disposed along a receive path. The one or more receive lenses may include a focus lens operable to focus a return signal onto the receiver. In such implementation, the method 1100 at (1106) may include imparting, via an actuator, a second oscillating motion to the focus lens. In some implementations, the second oscillating motion can include characteristics (e.g., frequency and/or span) that are approximately equal to the first oscillating motion. Alternatively, the second oscillating motion can include characteristics that are different from characteristics of the first oscillating motion.

At (1108), the method 1100 can include detecting, via the receiver, a return signal corresponding to a reflection of the transmit signal. In some implementation, the return signal can be received via the one or more receive lenses disposed along the receive path. At (1110), the method 1100 can include providing, via a detector of the receiver, data indicative of the return signal for generation of a point cloud.

Figure 12:
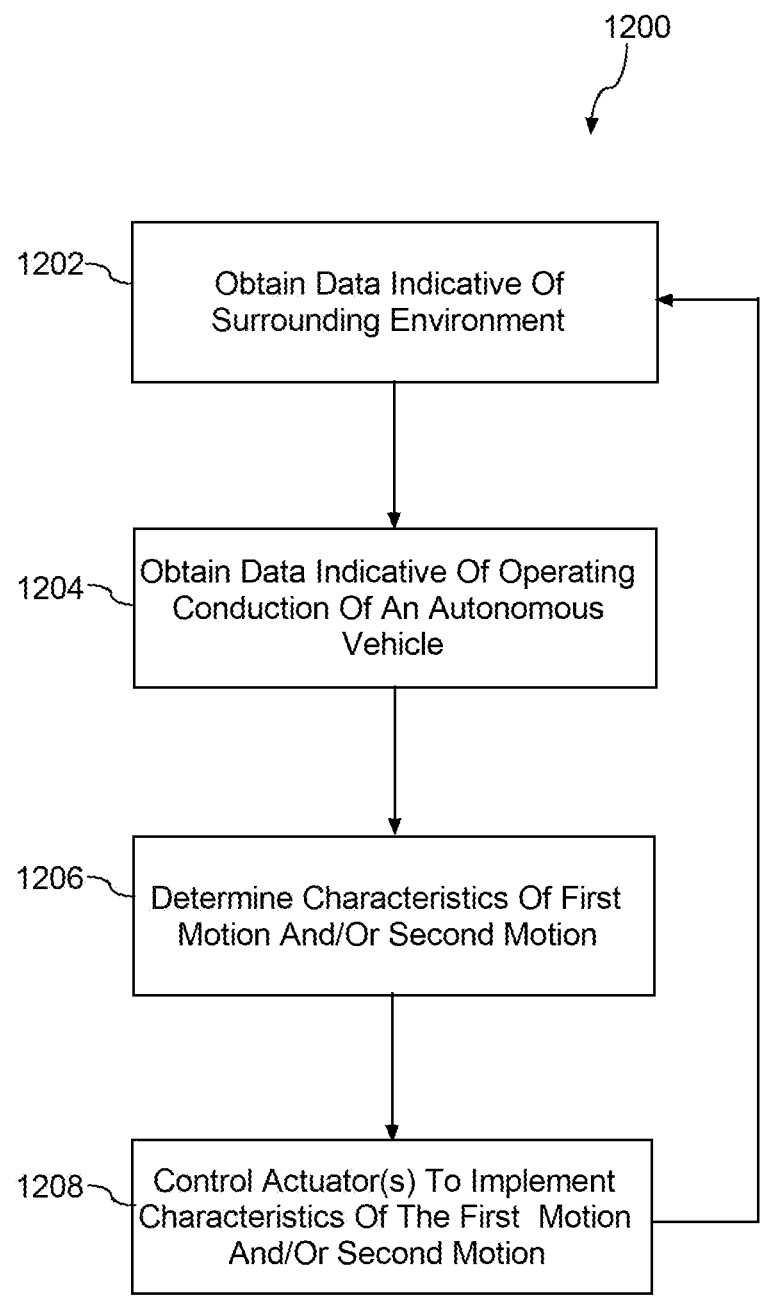
FIG. 12 depicts a flow diagram of an example method according to example embodiments of the present disclosure.

Referring now to FIG. 12, a flowchart diagram of an example method 1200 of varying characteristics of the first motion (e.g., first oscillation motion) and/or the second motion (e.g., second oscillating motion) depending on the characteristics of the surrounding environment and/or operation of an autonomous vehicle is provided according to example embodiments of the present disclosure. One or more portion(s) of the method 1200 can be implemented by a computing system that includes one or more computing devices such as, for example, the computing systems described with reference to the other figures (e.g., the vehicle computing system 112, the operations computing system 104, the one or more remote computing devices 106, etc.). Each respective portion of the method 1200 can be performed by any (or any combination) of one or more computing devices. Moreover, one or more portion(s) of the method 1200 can be implemented as an algorithm on the hardware components of the device(s) described herein to, for example, control operation of the actuator according to data obtained from the LIDAR system. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, include steps not illustrated omitted, combined, and/or modified in various ways without deviating from the scope of the present disclosure. FIG. 12 is described with reference to elements/terms described with respect to other systems and figures for example illustrated purposes and is not meant to be limiting. One or more portions of method 1200 can be performed additionally, or alternatively, by other systems.

At (1202), the method 1200 can include obtaining data indicative of the surrounding environment. At (1204), the method 1200 can include obtaining data indicative of the operating condition of an autonomous vehicle.

At (1206), the method 1200 can include determining the characteristics of the first motion (e.g., first oscillating motion) and/or the second motion (e.g., second oscillating motion) based, at least in part, on the data obtained at (1202) and (1204). The characteristics of the first motion and/or the second can include, for example, frequency and/or span (e.g., associated with the oscillation). In some implementations, for instance, the frequency of the first motion and/or the second motion can be determined based at least in part on a speed of the autonomous vehicle. As another example, the frequency of the first motion and/or the second motion can be determined based at least in part on the density of objects in the surrounding environment.

At (1208), the method 1200 can include controlling the actuators to implement characteristics of the first motion (e.g., first oscillating motion) and/or second motion (e.g., second oscillating motion). For instance, the frequency of scanning of the transmit signal can be adjusted to sweep at a particular rate appropriate for the speed of the autonomous vehicle. As another example, in areas with a dense population of objects (e.g., an urban environment), the scanning frequency can be increased relative to a scanning frequency in surrounding environments with a less dense or sparse population of objects (e.g., a rural environment). In this way, the density and/or resolution of data points in a point cloud generated from a LIDAR system according to example aspects of the present disclosure can be reduced and/or preserved in circumstances where they are not needed, allowing for preservation of computing resources of other functions of the LIDAR system and/or autonomous vehicle.

In some embodiments, an autonomous vehicle can utilize the described LIDAR system(s) of FIGS. 1-10 and/or the method(s) of FIGS. 11 and 12 to obtain increased sensor data (e.g., data points in a point cloud) for object(s) within a field of view with the LIDAR system during autonomous operation. For instance, an autonomous vehicle (e.g., its onboard computing system) can obtain sensor data via the LIDAR system. The sensor data can be indicative of an object within a field of view associated with the LIDAR system. The autonomous vehicle can determine perception data for the object within the field of view associated with the LIDAR system based at least in part on the sensor data. The perception data can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class); and/or other state information. The autonomous vehicle can determine future location(s) of the object based at least in part on the perception data. For example, the autonomous vehicle can generate a trajectory (e.g., including one or more waypoints) that is indicative of a predicted future motion of the object, given the object's heading, velocity, type, etc. over current/previous timestep(s). The autonomous vehicle can determine an action for the autonomous vehicle based at least in part on the detected object and/or the future location(s) of the object within the field of view associated with the LIDAR system. For example, the autonomous vehicle can generate a motion plan that includes a vehicle trajectory by which the vehicle can travel to avoid interfering/colliding with the object. In another example, the autonomous vehicle can determine that the object is a user that intends to enter the autonomous vehicle (e.g., for a human transportation service) and/or that intends to place an item in the autonomous vehicle (e.g., for a courier/delivery service). The autonomous vehicle can unlock a door, trunk, etc. to allow the user to enter and/or place an item within the vehicle. The autonomous vehicle can communicate one or more control signals (e.g., to a motion control system, door control system, etc.) to initiate the determined actions.

Figure 13:
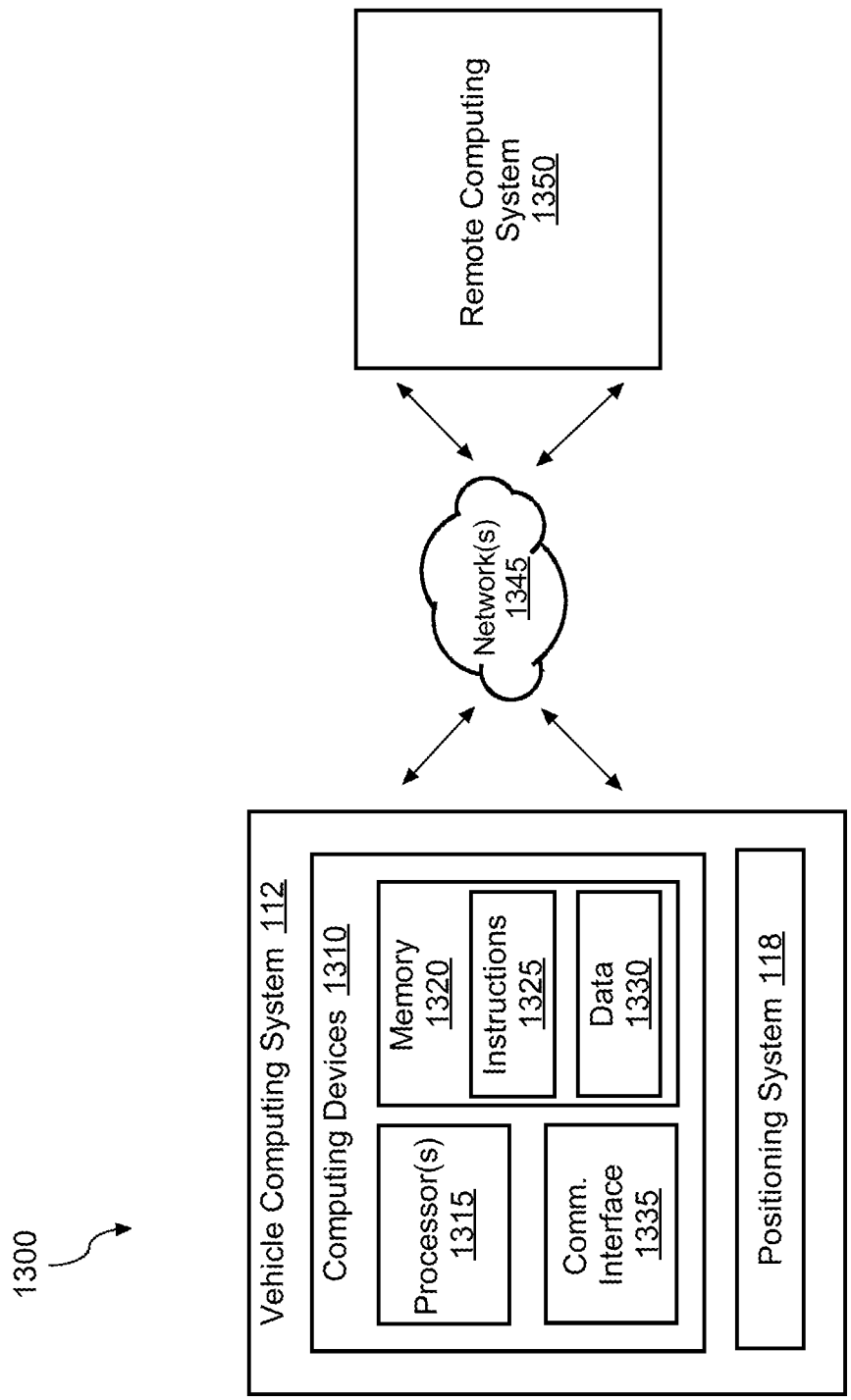
FIG. 13 depicts an example computing environment according to example embodiments of the present disclosure.

FIG. 13 depicts example system components of an example computing system 1300 according to example embodiments of the present disclosure. The example computing system 1300 can include the vehicle computing system 112 and the remote computing system(s) 1350 that are communicatively coupled over one or more network(s) 1345. The computing system 1300 can include one or more computing device(s) 1310. The computing device(s) 1310 of the vehicle computing system 112 can include processor(s) 1315 and a memory 1320. The one or more processors 1315 can be any suitable processing device (e.g., a processor core, a microprocessor, an ASIC, a FPGA, a controller, a microcontroller, etc.) and can be one processor or a plurality of processors that are operatively connected. The memory 1320 can include one or more non-transitory computer-readable storage media, such as RAM, ROM, EEPROM, EPROM, one or more memory devices, flash memory devices, etc., and combinations thereof.

The memory 1320 can store information that can be accessed by the one or more processors 1315. For instance, the memory 1320 (e.g., one or more non-transitory computer-readable storage mediums, memory devices) can include computer-readable instructions 1325 that can be executed by the one or more processors 1315. The instructions 1325 can be software written in any suitable programming language or can be implemented in hardware. Additionally, or alternatively, the instructions 1325 can be executed in logically and/or virtually separate threads on processor(s) 1315.

For example, the memory 1320 can store instructions 1325 that when executed by the one or more processors 1315 cause the one or more processors 1315 to perform operations such as any of the operations and functions for which the computing systems (e.g., cloud services system) are configured, as described herein.

The memory 1320 can store data 1330 that can be obtained, received, accessed, written, manipulated, created, and/or stored. The data 1330 can include, for instance, LIDAR data, point clouds, and/or other data/information described herein. In some implementations, the computing device(s) 1310 can obtain from and/or store data in one or more memory device(s) that are remote from the computing system 1300 such as one or more memory devices of the remote computing system 1350.

The computing device(s) 1310 can also include a communication interface 1335 used to communicate with one or more other system(s) (e.g., remote computing system 1350). The communication interface 1335 can include any circuits, components, software, etc. for communicating via one or more networks (e.g., 945). In some implementations, the communication interface 1335 can include for example, one or more of a communications controller, receiver, transceiver, transmitter, port, conductors, software and/or hardware for communicating data/information.

The network(s) 1345 can be any type of network or combination of networks that allows for communication between devices. In some embodiments, the network(s) 1345 can include one or more of a local area network, wide area network, the Internet, secure network, cellular network, mesh network, peer-to-peer communication link and/or some combination thereof and can include any number of wired or wireless links. Communication over the network(s)

1345 can be accomplished, for instance, via a network interface using any type of protocol, protection scheme, encoding, format, packaging, etc.

FIG. 13 illustrates one example system 1300 that can be used to implement the present disclosure. Other computing systems can be used as well. Computing tasks discussed herein as being performed at a cloud services system can instead be performed remote from the cloud services system (e.g., via aerial computing devices, robotic computing devices, facility computing devices, etc.), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

What is claimed is:

1. A light detection and ranging (LIDAR) system comprising:
   an emitter configured to emit a light signal;
   a plurality of first lenses positioned along a transmit path to provide transmit signals to a surrounding environment, the transmit signals based, at least in part, on the light signal, wherein the plurality of first lenses include a first axis collimating lens and a second axis collimating lens;
   a receiver spaced apart from the emitter, the receiver configured to detect return signals corresponding to reflected transmit signals from the surrounding environment, the return signals received by one or more second lenses positioned along a receive path; and
   an actuator coupled to at least one of the first axis collimating lens or the second axis collimating lens, the actuator operable to impart a motion to at least one of the first axis collimating lens or the second axis collimating lens to provide for steering of the transmit signals in the surrounding environment.

2. The LIDAR system of claim 1, wherein the light signal emitted by the emitter has a first divergence along a first axis relative to the emitter and a second divergence along a second axis relative to the emitter, the first divergence being different than the second divergence.

3. The LIDAR system of claim 2, wherein the first axis collimating lens is configured to act primarily on the first axis and the second axis collimating lens is configured to act primarily on the second axis.

4. The LIDAR system of claim 3, wherein the first axis collimating lens is positioned closer to the emitter relative to the second axis collimating lens.

5. The LIDAR system of any claim 4, wherein the actuator is a first actuator coupled to the first axis collimating lens and configured to impart a motion to the first axis collimating lens along the first axis to provide for steering of the transmit signals in the surrounding environment, the LIDAR system further comprising a second actuator coupled to second axis collimating lens, the second actuator configured to impart a motion to the second axis collimating lens along the second axis to provide for steering of the transmit signals in the surrounding environment.

6. The LIDAR system of claim 1, wherein the actuator is coupled to the one or more second lenses, the actuator operable to impart a motion to the one or more second lenses.

7. The LIDAR system of claim 6, wherein the actuator comprises a first actuator coupled to at least one of the first axis collimating lens or the second axis collimating lens and a second actuator coupled to the one or more second lenses.

8. The LIDAR system of claim 6, wherein:
   the motion associated with at least one of the first axis collimating lens or the second axis collimating lens has a first span, and
   the motion associated with the one or more second lenses has second span, the second span being approximately equal to the first span.

9. The LIDAR system of claim 1, wherein the emitter comprises a laser diode.

10. The LIDAR system of claim 1, wherein the receiver comprises a detector.

11. The LIDAR system of claim 1, wherein the one or more second lenses are different than the plurality of first lenses.

12. A method for scanning a surrounding environment using a light detection and ranging (LIDAR) system, the method comprising:
    emitting a light signal from an emitter through a plurality of first lenses respectively positioned along a transmit path to provide a transmit signal into a surrounding environment, the plurality of first lenses including a first axis collimating lens and a second axis collimating lens;
    imparting a first motion to at least one of the first axis collimating lens or the second axis collimating lens to provide for steering of the transmit signal in the surrounding environment;
    imparting a second motion to one or more second lenses disposed along a receive path;
    detecting, at a receiver, a return signal corresponding to a reflection of the transmit signal, the return signal received by the one or more second lenses disposed along the receive path.

13. The method of claim 12, wherein the method comprises determining a frequency of the first motion based at least in part on one or more detected characteristics of the surrounding environment, wherein imparting a first motion to at least one of the first axis collimating lens or the second axis collimating lens comprises imparting the first motion at the frequency.

14. The method of claim 12, wherein the first motion is a first oscillating motion having a first span, the second motion being a second oscillating motion having a second span, the second span being approximately equal to first span.

15. The method of claim 12, wherein the method comprises providing data indicative of the return signal for generation of a point cloud.

16. An autonomous vehicle comprising:
    a light detection and ranging (LIDAR) system coupled to a vehicle body of the autonomous vehicle, the LIDAR system comprising one or more channels comprising:
    an emitter configured to emit a light signal;
    a plurality of first lenses positioned along a transmit path to provide a transmit signal to a surrounding environment, the transmit signal based, at least in part, on the light signal, the plurality of first lenses comprising a first axis collimating lens and a second axis collimating lens;

a receiver spaced apart from the emitter, the receiver configured to detect a return signal received by one or more second lenses positioned along a receive path, the return signal corresponding to a reflection of the transmit signal; and an actuator coupled to the first axis collimating lens, the actuator operable to impart a motion to the first axis collimating lens to provide for steering of the transmit signal.

17. The autonomous vehicle of claim 16, wherein the one or more second lenses comprise a plurality of lenses, the plurality of lenses comprising a focus lens, the focus lens being closest to the receiver of the plurality of lenses, the actuator coupled to the focus lens, the actuator operable to impart the motion to the focus lens.

18. The autonomous vehicle of claim 16, wherein the one or more channels comprise a plurality of channels, wherein two or more channels of the the plurality of channels share a common second axis collimating lens.

19. The autonomous vehicle of claim 18, wherein respective channels have a separate emitter and a separate first axis collimating lens, and wherein the separate first axis collimating lens for respective channels of the plurality of channels is oriented in a different direction.

20. The autonomous vehicle of claim 18, wherein the actuator comprises a first actuator, the autonomous vehicle comprising a second actuator configured to impart a motion to the common second axis collimating lens.

* * * * *